United States Patent [19]
Topper et al.

[11] Patent Number: 5,548,332
[45] Date of Patent: Aug. 20, 1996

[54] APPARATUS AND METHOD FOR BLACK SHADING CORRECTION

[75] Inventors: Robert J. Topper, Hatboro, Pa.; Lee R. Dischert, Burlington, N.J.

[73] Assignee: Panasonic Technologies, Inc., Secaucus, N.J.

[21] Appl. No.: 427,657

[22] Filed: Apr. 21, 1995

Related U.S. Application Data

[63] Continuation of Ser. No. 229,457, Apr. 18, 1994, abandoned.

[51] Int. Cl.⁶ .......................... H04N 9/64; H04N 5/217
[52] U.S. Cl. ............................ 348/251; 348/243
[58] Field of Search ...................... 348/241, 243, 348/247, 251; H04N 9/64, 5/217

[56] References Cited

U.S. PATENT DOCUMENTS

| | | |
|---|---|---|
| 4,285,004 | 8/1981 | Morrison et al. . |
| 4,599,640 | 7/1986 | Dischert . |
| 4,663,666 | 5/1987 | Bloom . |
| 4,731,652 | 3/1988 | Yamanaka . |
| 4,970,598 | 11/1990 | Vogel . . |
| 5,047,861 | 9/1991 | Houchin et al. . |
| 5,134,474 | 7/1992 | Harafusa et al. .................. 313/247 |
| 5,272,536 | 12/1993 | Sudo et al. ......................... 348/243 |
| 5,283,655 | 2/1994 | Usami ............................. 348/257 |

FOREIGN PATENT DOCUMENTS 0516325  5/1992  European Pat. Off. ......... H04N 1/41

OTHER PUBLICATIONS

J. Freund, R. Walpole, Mathematical Statistics Prentice-Hall, Inc. pp. 254,255,138,139.

*Primary Examiner*—Michael Horabik
*Assistant Examiner*—Michael Day
*Attorney, Agent, or Firm*—Ratner & Prestia

[57] ABSTRACT

A technique is disclosed for correcting black shading errors in a video camera. The technique involves calculating a horizontal correction waveform as a function of the average pixel values for the columns of a field. Next, a vertical correction waveform is calculated as a function of the average pixel values for the rows of a field. Then, calculation of a diagonal correction waveform as a function of the average pixel values along predetermined diagonals is performed. Finally, an input video signal representing real images is combined with the correction waveforms to produce a video output signal having substantially reduced black shading errors. Correction waveforms can be determined in any order.

11 Claims, 3 Drawing Sheets

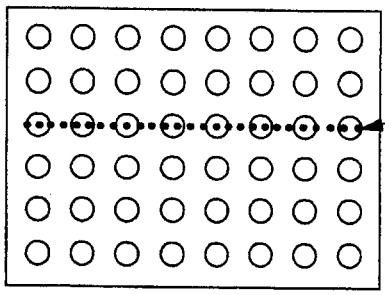
FIG. 3a
ELEMENTS SUMMED TO FORM V(2)
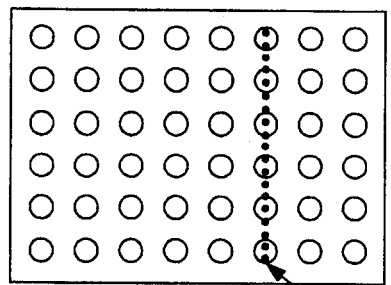
FIG. 3b   ELEMENTS SUMMED TO FORM H(5)
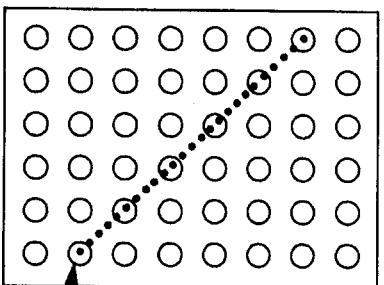
ELEMENTS SUMMED TO FORM $D_{45}(6)$
FIG. 3c
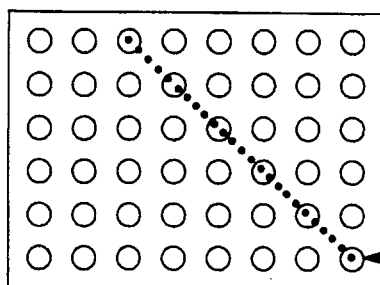
FIG. 3d   ELEMENTS SUMMED TO FORM $D_{315}(5)$

APPARATUS AND METHOD FOR BLACK SHADING CORRECTION

This application is a continuation of application Ser. No. 08/229,457 filed Apr. 18, 1994, now abandoned.

FIELD OF THE INVENTION

The invention relates generally to video cameras, and more particularly, it relates to black shading correction for video cameras.

BACKGROUND OF THE INVENTION

Television cameras are in widespread use in a variety of sensing, communication, and scientific applications. With the advent of improvements such as high-definition systems, camera defects will become more apparent to the television viewer. Thus, camera improvements are desirable. One of the defects to which cameras are subject is "dark current" or "black shading", which is current or charge (signal) which arises from the characteristics of the camera imager (the actual photosensitive screen) itself, and which does not depend on the image falling thereon.

The dark signal may be viewed as being the imager signal when a cap is placed on the associated lens to eliminate light from the image. In the context of charge-coupled device (CCD) imagers, the dark current may be viewed as "leakage" which results in charge which accumulates in each picture element (pixel) of the "A" register of the imager during the image integrating interval. Thus, each pixel includes a charge portion attributable to the integration of image information during the integrating interval, and also includes a charge portion attributable to dark current over the same interval.

Black shading errors, i.e., non-uniformities in the capped-black image of a video camera, have been corrected in various ways. The most basic method consists of the user adding varying amounts of DC, sawtooth and parabolic waveforms to the video signal in an attempt to remove these non-uniformities. This has the advantage of requiring very little memory since only the amplitude coefficients of the simple waveforms are stored. While this may have worked reasonably well with camera tubes, it does not lend itself to CCD correction due to the discrete nature of the sensing elements and the large number of high order waveforms needed for adequate correction.

Another technique which works with CCD cameras is to store the entire capped-black field in a large memory and subtract this from the video signal during operation to remove shading errors. While this results in pixel by pixel correction, it is very expensive and hardware intensive since a full field of memory is required for each channel.

SUMMARY OF THE INVENTION

The present invention involves the correction of black shading errors. The invention includes calculating correction signals, for example, calculating a horizontal correction signal as a function of the average pixel values in the columns; calculating a vertical correction signal as a function of the average pixel values in the rows; calculating at least one diagonal correction signal as a function of the average pixel values along diagonals; and combining a video input signal with the respective correction signals to produce a video output signal with reduced black shading errors.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawing, in which:

FIGS. 3a–3d illustrate exemplary summing techniques for the horizontal, vertical and diagonal directions employed by the present invention.

DETAILED DESCRIPTION

The present invention has the ability to satisfactorily correct the kinds of black shading errors normally found in CCD imagers and yet, the exemplary embodiment of the present invention, uses only approximately 2.2 Kbytes of high-speed memory instead of the 135 Kbytes used by the field store method.

Further, since the signals obtained for correcting the black shading errors are derived from the device itself, correction is much more accurate than systems which use varying amounts of pre-determined signals.

Figure 1:
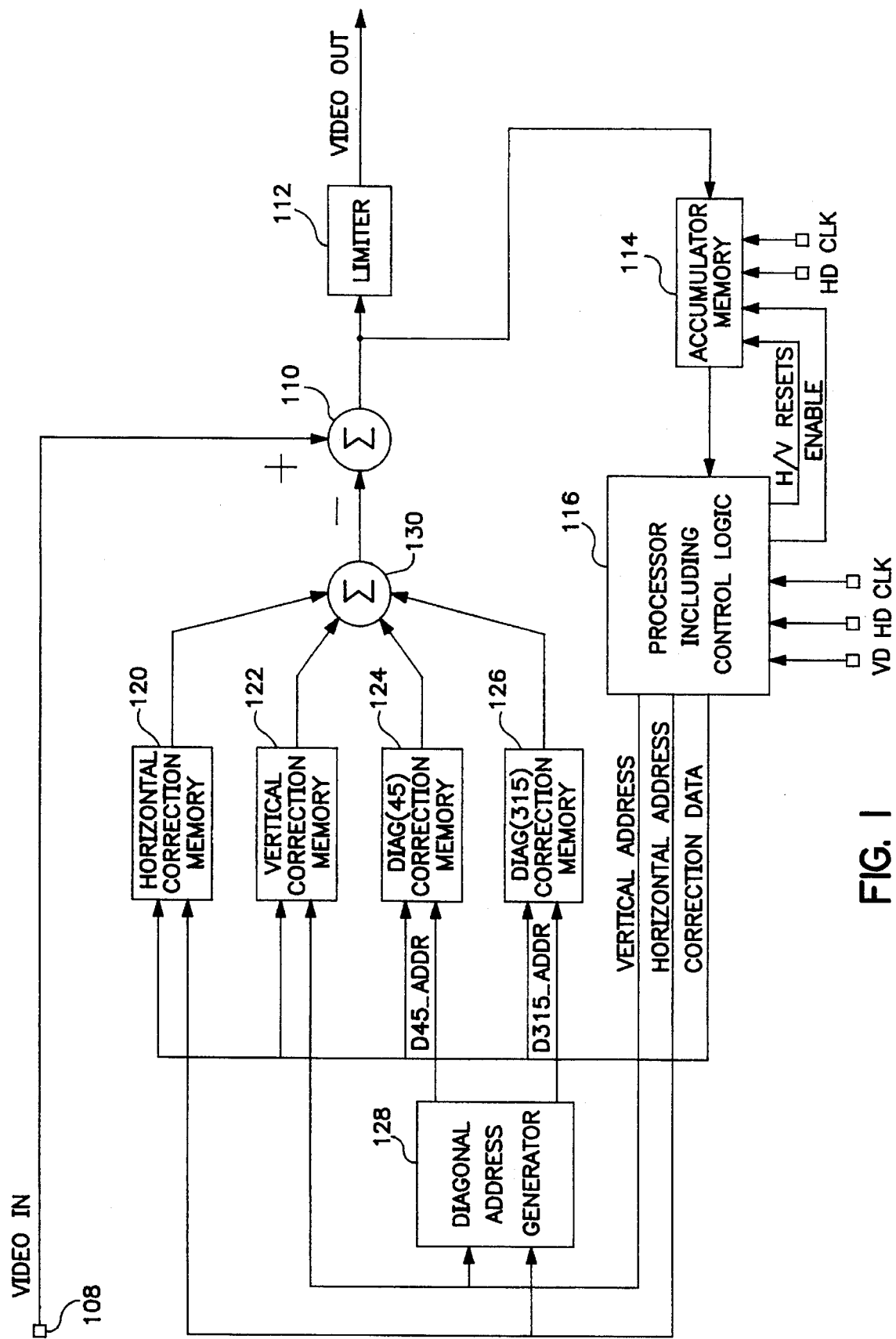
FIG. 1 shows a functional block diagram of an exemplary embodiment of a system suitable for use with the present invention.

FIG. 1 is a functional block diagram of an exemplary embodiment of the present invention. As shown in FIG. 1, input terminal 108 receives a video input signal from the image sensing portion of the camera. At summing circuit 110, a correction signal representing the black shading error is subtracted from the video input signal. This resulting signal is input to limiter 112, processed and output as the video output signal. The functional blocks for calculating the correction signal representing the black shading error are now described.

The process of acquiring the correction signals is started by capping the camera and clearing all of the correction memories 120, 122, 124, and 126.

Next, a video input signal which, because the camera is capped and the correction memories are cleared, represents the black shading signal is passed through summing circuit 110. Because the correction memories have been cleared, at this point, nothing is being subtracted from the input signal at summing circuit 110.

The black shading signal is then received by the accumulator memory 114 for purposes of summing the pixel information in predetermined directions within the signal field. In the exemplary embodiment, the predetermined directions are vertical, horizontal, 45° diagonal, and 315° diagonal. The accumulator memory is described in detail with reference to FIG. 2 below.

Continuing with FIG. 1, control signals such as the horizontal and vertical resets as well as an enable signal are provided to the accumulator memory 114 by control processor 116. The accumulated information calculated by accumulator memory 114 is passed to control processor 116. With assistance from the diagonal address generator 128, the correction signals calculated by the accumulator memory 114 are provided by the control processor 116 to their respective memories: horizontal correction memory 120, vertical correction memory 122, diagonal (45) correction memory 124, and diagonal (315) correction memory 126.

As seen in FIG. 1, in the exemplary embodiment of the present invention, the respective output signals of the correction memories 120, 122, 124, and 126 are summed by summing circuit 130 and, finally subtracted from the video input signals by summing circuit 110.

Figure 2:
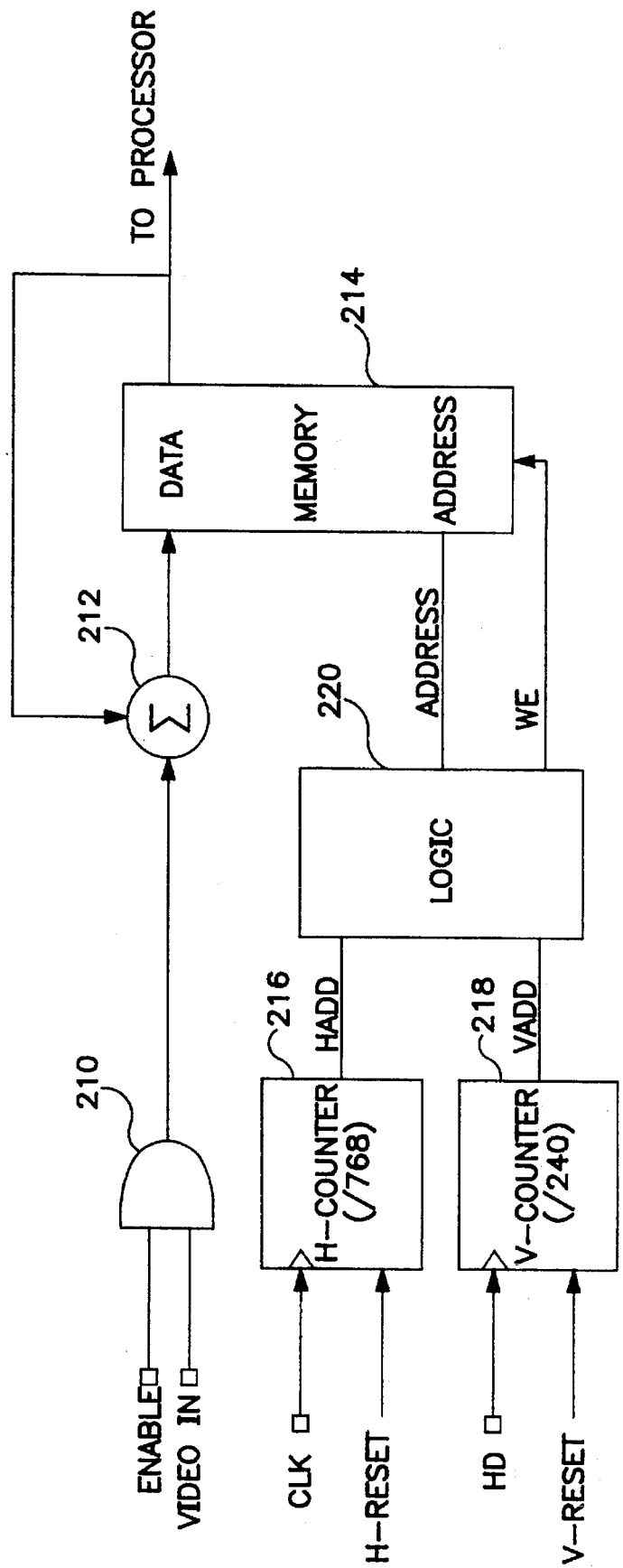
FIG. 2 shows a functional block diagram of the accumulator memory shown in FIG. 1.

FIG. 2 is a functional block diagram showing additional details of the accumulator memory 114 shown in FIG. 1. When determining the signals to be used for video signal correction, a signal representing the average of each line in a predetermined direction in the field is loaded into the appropriate correction memory. For example, assuming 6-bit correction signals, each byte of the vertical correction signal is the average of the corresponding line of the video field. Thus, if the CCD image size is 768 pixels by 240 lines, the vertical correction signal is 240×6-bits.

Continuing with FIG. 2, the actual video input signal to the accumulator memory 114 is controlled by way of an enable signal supplied by control processor 116 which is ANDed with the video input signal at AND gate 210. The enable signal is generated by a "SHADE" command which should be executed when the camera is capped. Assuming the video input is enabled, the video input signal is accumulated with the data already stored in memory 214 by a feedback to summing circuit 212.

The addresses to be used to perform the accumulation of pixel information in predetermined directions within a field and the corresponding write enable (WE) signals used to store the accumulated data into the memory are generated by a horizontal address counter (H-counter) 216, a vertical address counter (V-counter) 218 and various logic 220. The H-counter 216 generates its output signal as a function of a clock (CLK) signal and the horizontal reset (H-RESET) signal. The V-counter 218 generates its output signal as a function of the horizontal drive (HD) signal and the vertical reset (V-RESET). The outputs of each counter are then processed by logic 220 to produce the appropriate addresses for inputting to and outputting from data memory 214.

In the exemplary implementation of calculating the vertical correction signal, horizontal averaging is used to calculate the correction signal. Referring to FIG. 2, for vertical correction, the H-counter 216 is held reset by H-RESET signal (provided by control processor 116) so that the address to memory 214 is a function of the V-counter output and the HD signal.

Practically, the memory 214 forms the storage element of a recursive filter. At the end of the first line of pixels, the first element of memory 214 contains the sum of all of the pixels in the first line of the initial field, and so on down the field. At the end of the initial field, the line sums are transferred to control processor 116 where they are divided by the total number of pixels a line (in the exemplary embodiment this is 768) to form the line averages. This signal (i.e., the line averages) is then transferred to the vertical correction memory 122 so that the video can be corrected in the vertical direction. Once complete, the process starts over again, this time in the horizontal direction. In the exemplary embodiment, a video signal corrected in the vertical direction is used for the next step.

Referring again to FIG. 2, the V-counter 218 is now held reset for the vertical averaging so that, at the end of the next field, each cell in the memory 214 contains the sum of the corresponding column in the field. The vertical sums, like the horizontal sums, are transferred to the control processor 116 where the column averages are computed and down-loaded to the horizontal correction memory 120 which, in the exemplary embodiment, is 768×6-bits.

The two signals computed so far can now be added together and subtracted from the video, thus, the CCD image can now be corrected in both the horizontal and vertical directions. Again, in the exemplary embodiment, a video signal corrected in both the horizontal and vertical directions is used for the next step.

The computation of the two exemplary diagonal correction signals is now described. Both counters are enabled and the address of the accumulator memory 214 becomes a function of both the H-counter 216 output and the V-counter 218 output. In the exemplary embodiment of the present invention, the 45 degree direction address to the memory is computed as follows:

$$ADDRESS = HADD + VADD - 1.$$

And, the 315 degree direction address to the memory follows the equation:

$$ADDRESS = 767 - HADD + VADD$$

where the field is 768 pixel wide. The actual calculation of the addresses as a function of HADD and VADD occurs in logic 220.

Continuing with the calculation of the 45° diagonal correction signal, at the end of the field the sums of the pixels are transferred to the control processor 116 where they are divided by the total number of pixels used to accumulate each sum. It should be noted that only one pixel contributes to the first sum so the "sum" is the average value, whereas, five pixels contribute to the fifth sum so it is divided by five to obtain its average, and so on.

The 45° diagonal correction signal is downloaded to a memory which is 1007×6-bits long. (In general, for an M pixel ×N line image size, the memory size for diagonal correction is M+N−1×6-bits.) The video can now be corrected with the three available signals.

The remaining diagonal signal—diagonal (315) correction signal—is calculated in the same manner as the diagonal (45) correction signal.

In actual operation of the exemplary embodiment, four values are subtracted from each pixel in the field, the values of which depend on the particular pixel's position in the raster. In the exemplary embodiment, the final output (output signal from summing circuit 110) is then limited to avoid digital overload.

It should be noted that, in the exemplary embodiment of the present invention, a value of 16 is subtracted from each pixel value before it is added to the accumulated value (as shown in the computations presented below). This is done because, in the exemplary embodiment, 16 represents the nominal black value, that is to say, it represents an desired or proper black value level. It should be noted that the adjustment by the nominal black value can be accomplished in either the accumulator memory or post processor. Additionally, those skilled in the art can appreciate that this value may vary depending on the predetermined desired black value of a particular system.

The following computations assume a field size of M pixels×N lines, where M>N.

FIG. 3a illustrates just one line (line 2) of the following computations for horizontal averaging (vertical correction):

$$V(j) = \frac{1}{M} \sum_{i=0}^{M-1} [x_{in}(i,j) - 16]$$

Pixel with vertical correction $$x_1(i,j) = x_{in}(i,j) - V(j)$$

FIG. 3b illustrates just one column (column 5) of the following computations for vertical averaging (horizontal correction):

$$H(i) = \frac{1}{N} \sum_{j=0}^{N-1} [x_1(i,j) - 16]$$

Pixel with vertical and horizontal correction:

$$x_2(i,j) = x_{in}(i,j) - [V(j) + H(i)]$$

FIG. 3c illustrates just one diagonal (diagonal 6) for the following diagonal (+45° direction) correction computations (done in two steps for clarity):

$$CUM_{45}(k) = \sum_{i=0}^{k} [x_2(i, k-i) - 16] \bigg|_{k-N<i<M}$$

Computing average and letting k=i+j, $$D_{45}(k) = \begin{cases} \frac{1}{k+1} CUM_{45}(k) & 0 < k < N-1 \\ \frac{1}{N} CUM_{45}(k) & N-1 \leq k < M \\ \frac{1}{M+N-1-k} CUM_{45}(k) & k \geq M \end{cases}$$

Pixel with vertical, horizontal and diagonal (345) correction:

$$x_3(i,j) = x_{in}(i,j) - [V(j) + H(i) + D_{45}(k)]$$

FIG. 3d illustrates just one diagonal (diagonal 5) for the following diagonal (315° direction) correction computation:
Again, computing average and letting k=i+j, $$CUM_{135}(k) = \sum_{i=0}^{k} [x_3(i, M-1-k-i) - 16] \bigg|_{k-M-1 \leq i<N}$$

$$D_{315}(k) = \begin{cases} \frac{1}{k+1} CUM_{315}(k) & 0 < k < N-1 \\ \frac{1}{N} CUM_{315}(k) & N-1 \leq k < M \\ \frac{1}{M+N-1-k} CUM_{315}(k) & k \geq M \end{cases}$$

Pixel with all four corrections:

$$x_4(i,j) = x_{in}(i,j) - [V(j) + H(i) + D_{45}(k) + D_{315}(k)]$$

Accordingly, $x_4(i,j)$ represents the corrected pixel value where the corresponding correction signal value for each of the four exemplary signals is subtracted from the input pixel value. The calculation of $x4(i,j)$ is illustrated by the combination of summing circuits 110 and 130 in FIG. 1.

The present invention represents a practical solution using actual device characteristics for reducing black shading errors when considering 1) the enormous amount of memory needed to store the black shading errors for each pixel in an entire field and 2) the potentially inaccurate technique of applying predetermined signals (i.e., not directly generated from an individual CCD array) to a device comprising many discrete elements.

Although the invention is illustrated and described herein as embodied in a method and apparatus for correcting black shading errors using correction signals for four predetermined directions, the invention is not intended to be limited to the details shown. Rather, various modifications may be made in the details within the scope and range of equivalents of the claims and without departing from the spirit of the invention.

What is claimed:

1. An apparatus for correcting black shading errors in a video camera comprising:

means for receiving a first video input signal representative of a capped-camera image and containing black shading errors;

means for calculating a plurality of correction signals from the first video input signal, wherein the plurality of correction signals includes at least one diagonal correction signal derived from a predetermined set of diagonally-oriented pixels;

means for combining the first video input signal with the plurality of correction signals to produce a video output signal with reduced black shading errors.

2. The apparatus of claim 1, wherein the plurality of correction signals includes a horizontal correction signal.

3. The apparatus of claim 2, wherein the horizontal correction signal is based on an average of differences between measured and desired pixel values for a plurality of columns in the video input signal.

4. The apparatus of claim 1, wherein the plurality of correction signals includes a vertical correction signal.

5. The apparatus of claim 4, wherein the vertical correction signal is based on an average of differences between measured and desired pixel values for a plurality of rows in the video input signal.

6. The apparatus of claim 1, wherein the diagonal correction signal is based on an average of differences between measured and desired pixel values along predetermined diagonals in the video input signal.

7. The apparatus of claim 1, wherein the means for generating a plurality of correction signals includes a memory coupled to a summing circuit and an address generating circuit.

8. A method for correcting black shading errors in a video camera comprising the steps of:

capping the video camera;

receiving a first video signal representative of a capped-camera image and containing black shading errors;

calculating a vertical correction signal from the first video signal;

calculating a horizontal correction signal from the first video signal;

calculating at least one diagonal correction signal from the first video signal, said diagonal correction signal being derived from a predetermined set of diagonally-oriented pixels; and receiving and combining a second video input signal representing real images with the respective correction signals to produce a video output signal with reduced black shading errors.

9. An apparatus for iteratively correcting black shading errors in a video camera comprising:

means for receiving a first video input signal representative of a capped-camera image and containing black shading errors;

means for generating a first directional correction signal responsive to the first video input signal, said first directional correction signal being derived from a predetermined set of diagonally-oriented pixels;

means for combining the first directional correction signal with the first video input signal to generate a first corrected video signal;

means, responsive to the first corrected video signal, for generating a second directional correction signal; and means for combining the first corrected video signal and the second directional correction signal to produce a second corrected video signal.

10. The apparatus of claim 9 further including:

means, responsive to the second corrected video signal, for generating a third directional correction signal; and means for combining the second corrected video signal with the third directional correction signal to produce a video output signal.

11. The apparatus of claim 10, wherein the second directional correction signal is a vertical correction signal, the third directional correction signal is a horizontal correction signal, each of the directional correction signals being derived from predetermined sets of pixels from the capped-camera image.

* * * * *